(12) United States Patent
Eppink

(10) Patent No.: US 6,659,200 B1
(45) Date of Patent: Dec. 9, 2003

(54) ACTUATOR ASSEMBLY AND METHOD FOR ACTUATING DOWNHOLE ASSEMBLY

(75) Inventor: Jay M. Eppink, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 09/678,817

(22) Filed: Oct. 4, 2000

Related U.S. Application Data

(63) Continuation-in-part of application No. 09/467,588, filed on Dec. 20, 1999.

(51) Int. Cl.⁷ .............................. E21B 4/02; E21B 7/04
(52) U.S. Cl. ................... 175/61; 175/107; 166/381
(58) Field of Search .............................. 175/61, 73, 93, 175/104, 107; 166/381, 383, 105; 418/48

(56) References Cited

U.S. PATENT DOCUMENTS

| | | | |
|---|---|---|---|
| 3,677,665 A | * 7/1972 | Corkill .................... 418/48 X |
| 3,713,500 A | 1/1973 | Russell ........................ 175/73 |
| 3,749,185 A | * 7/1973 | Tiraspolsky et al. .......... 175/26 |
| 3,749,511 A | * 7/1973 | Mayall ........................ 415/113 |
| 3,799,277 A | 3/1974 | Kellner ........................ 175/94 |
| 3,888,319 A | 6/1975 | Bourne, Jr. et al. ........... 175/76 |
| 3,989,114 A | * 11/1976 | Tschirky et al. ............. 175/107 |
| 4,040,494 A | 8/1977 | Kellner ........................ 175/45 |
| 4,199,201 A | * 4/1980 | Trzeciak ................. 175/371 X |
| 4,204,810 A | * 5/1980 | Vogel ......................... 417/244 |
| 4,232,751 A | * 11/1980 | Trzeciak ................. 175/107 X |
| 4,298,077 A | * 11/1981 | Emery .................... 175/107 X |
| 4,386,654 A | * 6/1983 | Becker ..................... 166/105.5 |
| 4,463,814 A | 8/1984 | Horstmeyer et al. .......... 175/45 |
| 4,471,843 A | 9/1984 | Jones, Jr. et al. .............. 175/73 |
| 4,568,145 A | 2/1986 | Colin et al. ................. 350/96.2 |
| 4,632,193 A | * 12/1986 | Geczy .................... 175/107 X |
| 4,768,598 A | * 9/1988 | Reinhardt ................ 175/107 X |
| 4,854,397 A | 8/1989 | Warren et al. ................. 175/26 |
| 5,053,660 A | * 10/1991 | Sneddon ....................... 310/80 |
| 5,139,094 A | 8/1992 | Prevedel et al. .............. 175/61 |
| 5,165,491 A | 11/1992 | Wilson ........................ 175/62 |
| 5,174,392 A | * 12/1992 | Reinhardt .................... 175/107 |
| 5,220,963 A | 6/1993 | Patton ......................... 175/24 |
| 5,265,687 A | * 11/1993 | Gray ........................ 175/73 X |
| 5,314,032 A | 5/1994 | Pringle et al. ................ 175/74 |
| 5,316,094 A | 5/1994 | Pringle et al. .............. 175/230 |
| 5,332,048 A | 7/1994 | Underwood et al. .......... 175/26 |
| 5,373,898 A | 12/1994 | Pringle et al. ................ 166/72 |
| 5,394,951 A | 3/1995 | Pringle et al. ................ 175/61 |
| 5,485,889 A | 1/1996 | Gray ........................... 175/61 |
| 5,542,482 A | 8/1996 | Eddison ....................... 175/61 |
| 5,738,178 A | 4/1998 | Williams et al. .............. 175/61 |
| 5,778,992 A | 7/1998 | Fuller ........................... 175/73 |

(List continued on next page.)

FOREIGN PATENT DOCUMENTS

| | | | |
|---|---|---|---|
| FR | 2656035 | * 6/1991 | |
| GB | 2042609 | 9/1980 | ............. E21B/7/04 |
| GB | 2233363 | 1/1991 | ............. E21B/7/08 |

*Primary Examiner*—Jong-Suk(James) Lee
(74) *Attorney, Agent, or Firm*—Conley Rose, P.C.

(57) ABSTRACT

An actuator assembly is a valveless, high pressure, positive displacement, axial drive system including a hydraulic fluid reservoir and a hydraulic enclosure in an actuator housing with a bi-directional pump assembly driven by an electric motor and a piston assembly disposed within the hydraulic enclosure. The bi-directional pump accurately displacing the piston a given distance to exert a large drive or actuation force and to maximize that actuation force given a limited electrical current transmitted to the motor. Because the pump is bi-directional, the piston can be repositioned after actuation by reversing the direction of flow through the pump without using valves to direct the hydraulic fluid flow. The actuator assembly may also include a piston repositioning assembly connected to the hydraulic enclosure.

45 Claims, 4 Drawing Sheets

U.S. PATENT DOCUMENTS

| | | | |
|---|---|---|---|
| 5,842,149 A | 11/1998 | Harrell et al. | 702/9 |
| 5,860,864 A * | 1/1999 | Vukovic | 464/147 |
| 5,871,051 A * | 2/1999 | Mann | 166/377 |
| 5,913,337 A | 6/1999 | Williams et al. | 138/125 |
| 5,934,383 A | 8/1999 | Jurgens et al. | 173/91 |
| 6,016,288 A * | 1/2000 | Frith | 367/85 |
| 6,019,583 A * | 2/2000 | Wood | 418/48 |
| 6,039,115 A * | 3/2000 | Mills | 166/68.5 |
| 6,047,784 A * | 4/2000 | Dorel | 175/61 |
| 6,183,226 B1 * | 2/2001 | Wood et al. | 418/48 |
| 6,206,108 B1 * | 3/2001 | MacDonald et al. | 175/61 X |
| 6,289,998 B1 * | 9/2001 | Krueger et al. | 175/25 |
| 6,419,014 B1 * | 7/2002 | Meek et al. | 166/255.2 |

* cited by examiner

US 6,659,200 B1

ACTUATOR ASSEMBLY AND METHOD FOR ACTUATING DOWNHOLE ASSEMBLY

CROSS-REFERENCE TO RELATED APPLICATION

This application is a continuation-in-part of U.S. patent application Ser. No. 09/467,588, filed Dec. 20, 1999 and entitled "Three Dimensional Steerable System," hereby incorporated herein by reference.

FIELD OF THE INVENTION

The present invention relates to improved apparatus and methods for operating a downhole actuator system, and more particularly to a downhole actuator system for driving another downhole component with a large actuation force, and still more particularly to a valveless and reversible hydraulic piston actuator system that actuates a piston to drive another downhole member with a large actuation force and then resets the piston to its pre-actuation position.

BACKGROUND OF THE INVENTION

The conventional practice for actuating a piston downhole under high loads requires a hydraulic actuation system having many component parts, including valves. FIG. 1 illustrates a typical prior art downhole actuation system, which includes a closed hydraulic system 100 having a cylinder 110 with an internal piston 120 disposed therein, a reservoir 130 to store hydraulic fluid, a pump 140 to move the hydraulic fluid, and valves 150, 160 to direct the hydraulic fluid flow. The pump 140 is driven by a prime mover such as an electric motor.

The cylinder 110 includes a high-pressure chamber 112 on one side of the piston 120 and a low-pressure chamber 114 on the other side of the piston 120. The piston 120 includes a shaft 122 that drives another downhole member when piston 120 is actuated. The reservoir 130 is a separate, closed container used to store the hydraulic fluid under high pressure. The pump 140 is disposed between the reservoir 130 and the cylinder 110 such that the pump suction line 142 communicates with the reservoir 130 and the pump discharge line 144 communicates with high-pressure chamber 112. Valve 150, with solenoid or motor operator 152, is located on the pump discharge line 144 leading into cylinder 110. Valve 160, with solenoid or motor operator 162, is located on the reservoir return line 132 connecting the pump discharge line 144 to the reservoir 130. Valves 150, 160 direct the flow of hydraulic fluid between the reservoir 130 and the high-pressure chamber 112, and the fluid path depends upon whether valves 150, 160 are open or closed.

The hydraulic system 100 has three operating configurations: 1) actuating, 2) recirculating, and 3) reverse, determined by the open or closed positions of valves 150, 160. To actuate the piston 120, the operator places the hydraulic system 100 in the actuating configuration by opening valve 150, closing valve 160, and turning on the pump 140. Hydraulic fluid flows along flow path 170 out of the reservoir 130, into the pump suction line 142, through the pump 140, which increases the hydraulic fluid pressure, and into the pump discharge line 144. With valve 160 closed, the flow path into the reservoir return line 132 is blocked, and as indicated by flow arrow 172, the hydraulic fluid flows through valve 150 and into high pressure chamber 112 to actuate the piston 120. As the piston 120 moves forward within cylinder 110, shaft 122 drives a downhole member associated with the piston shaft 122.

To momentarily maintain the piston 120 in a stationary position without shutting down the pump 140, the operator can place hydraulic system 100 in the recirculating position by closing valve 150 and opening valve 160. With valve 150 closed, the flow path into cylinder 110 is blocked, and as indicated by flow arrow 174, the hydraulic fluid flows through valve 160, into the reservoir return line 132, and back to the reservoir 130 along flow path 178. The piston 120 is therefore maintained in a stationary position because hydraulic fluid is prevented from entering or exiting cylinder 110. To maintain piston 120 in a stationary position for a longer duration, the pump 140 can be shut off and both valves 150, 160 closed to prevent hydraulic fluid flow.

To move the piston 120 back up in cylinder 110 and reposition it for another actuation, the hydraulic system 100 is placed in a reverse configuration by opening both valves 150, 160 and shutting off the pump 140. As indicated by flow arrow 176, if the pressure in the reservoir 130 is lower than the pressure in the high-pressure chamber 112, hydraulic fluid will tend to flow out of chamber 112 through valves 150, 160, through reservoir return line 132, and back into reservoir 130 along flow path 178, thereby allowing piston 120 to move upward in cylinder 110.

The conventional hydraulic actuation system 100 of FIG. 1 comprises a complex configuration of parts working together in a closed system. In particular, the valves 150, 160 of the conventional hydraulic actuation system 100 are problematic because they have close internal tolerances and small diameter ports and holes for hydraulic fluid flow, making the valves 150, 160 susceptible to clogging due to small particles entering the valve internals. To ensure the valves 150, 160 do not fail or operate ineffectively, filters and screens are required to prevent small particles from entering the valve internals. It would be advantageous to have a less complex configuration than the conventional hydraulic actuation system 100. In particular it would be advantageous to have a closed hydraulic system that eliminates the need for valves 150, 160 and can also operate bi-directional to actuate a piston under high loads and then reset the piston. It would further be advantageous to have an actuation system that provides a precise movement of the actuation shaft.

The present invention overcomes the deficiencies of the prior art.

SUMMARY OF THE INVENTION

The actuator system of the present invention is a valveless, high pressure, positive displacement, axial drive system including a hydraulic fluid reservoir, a hydraulic enclosure, a bi-directional pump assembly driven by an electric motor, and a piston assembly, all contained within an actuator housing. The actuator system may also include a piston repositioning assembly connected to the hydraulic enclosure but separated from the actuator housing.

The hydraulic fluid reservoir maintains fluid communication with the hydraulic enclosure and has an internal compensating piston that adjusts with the changes in fluid level in the reservoir. The hydraulic enclosure encapsulates the pump assembly and piston assembly in hydraulic fluid and provides a closed system that prevents hydraulic fluid contamination, such as by drilling fluids. The hydraulic enclosure includes a low-pressure cavity and a low-pressure chamber above the pump, a high-pressure chamber below the pump, and a piston cylinder defined as the area within which the piston reciprocates.

An electric motor drives the pump and includes electrical conductors, a power section, and a driveshaft. The electrical conductors provide power to the power section. The power section of the motor, which is mounted internally of the actuator housing but outside the hydraulic enclosure, turns the drive shaft, which extends into the hydraulic enclosure. The drive shaft is supported by combination thrust and radial bearings, and there is fluid communication across the bearings so that the motor is exposed to the same pressure as the hydraulic enclosure. Because the drive shaft support bearings do not seal the motor from the hydraulic enclosure pressure, the bearings do not create frictional loses that reduce the force capacity of the system. The lower end of the drive shaft is connected to a linkage, and the linkage is connected to the rotor of the bi-directional pump.

The bi-directional pump assembly preferably utilizes a moineau pump, but can use any type of reversible pump capable of providing adequate pressure to drive the piston with a high actuation force. The pump includes a stator through which the rotor is disposed. The lower end of the rotor extends through a bearing pack, which supports the rotor as it moves. There is a passageway through the bearing pack so that hydraulic fluid can readily flow from the pump to the positioning piston. The lower end of the rotor is threaded into a nut that maintains the bearing pack against a flange in the actuator housing.

The piston assembly includes a positioning piston, a shaft, and a return spring. The positioning piston is connected to a shaft that drives another downhole member when the piston is actuated to move forward, such as, for example, a wedge member of a drill bit steering assembly. The return spring is compressed against the lower face of the positioning piston and provides a reverse force on the positioning piston to move it to its original position after the piston has been actuated.

As an alternative to the return spring in the piston assembly, or in addition thereto, the actuator system may include a piston repositioning assembly that is external to, and positioned in a different axial plane from, the actuator housing. The piston repositioning assembly includes a chamber, a repositioning piston, and a biasing spring. The repositioning piston and biasing spring are disposed within the chamber, which has a port through its wall leading into a fluid passageway that maintains fluid communication between the chamber and the piston cylinder of the hydraulic enclosure. The biasing spring exerts a force on the repositioning piston to force fluid through the fluid passageway and into the piston cylinder. This fluid pushes against the positioning piston to reposition it for another actuation.

The actuator system is typically a component of a downhole tool such as a bottom hole assembly used for drilling the borehole of a well. The actuator system is designed to drive another downhole member, such as, for example, the wedge member of the three-dimensional, steerable drilling assembly of U.S. patent application Ser. No. 09/467,588, hereby incorporated herein for all purposes. However, the actuator system of the present invention may be used for any type of downhole actuator application.

The actuator system is designed to move the piston a precise distance away from the pump to exert a large actuation force. This is achieved by displacing a specific volume of hydraulic fluid from the low-pressure chamber into the high-pressure chamber through the bi-directional pump, preferably a moineau pump. A moineau pump is advantageous due to the reduced pressure drop through the pump components as compared to other pumping equipment. The pressure output from a moineau pump is approximately 150 psi per section of rotor and stator, otherwise known as a stage or lobe. Therefore, a large number of stages will be joined together, end to end, to achieve the required actuation pressure, which is preferably in a range greater than 5000 psi, and more preferably approximately 6000 psi.

The piston responds by stroking a specific distance forward within the piston cylinder to accept the new volume of hydraulic fluid moving into the high-pressure chamber. The pressure increase through the moineau pump determines the pressure or actuation force on the piston, and therefore on the member being driven by the piston. The electrical current that can be passed from the surface down a wireline or through composite coiled tubing to the electric motor is limited. Thus, one objective of the present invention is to maximize the actuation force given the limited current that can be transmitted downhole. Once the piston has been actuated, a linear potentiometer or another device may be used to determine its exact position.

The moineau pump can be driven in either direction, and when the motor is reversed, fluid moves out of the high-pressure chamber, through the pump, and back into the low-pressure chamber. As the pressure is removed from the positioning piston, the return spring will move the piston in reverse into its pre-actuation position. Alternatively, in circumstances such as when the actuator assembly is being tested at the surface, the piston repositioning assembly can provide the force necessary to move the positioning piston to its pre-actuation position.

In summary, the actuator system of the present invention is a valveless, bi-directional, hydraulic piston assembly. The actuator system includes a bi-directional pump assembly designed to accurately displace the piston a given distance with a large force and maximize that actuation force given the limited electrical current that can be transmitted downhole to drive the motor. Because the pump is bi-directional, the piston can be repositioned after actuation by reverse-flowing the pump without using valves, thus eliminating the complexity of some prior art systems.

Thus, the present invention comprises a combination of features and advantages that enable it to overcome various problems of prior art actuation systems. The various characteristics described above, as well as other objects and advantages of the invention, will be readily apparent to those skilled in the art upon reading the following description.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

The present invention relates to improved methods and apparatus for actuating a piston downhole with a large actuation force using a valveless and bi-directional actuator apparatus. The present invention is susceptible to embodiments of different forms. The drawings described in detail herein illustrate a specific embodiment of the present invention, however the disclosure should be understood to exemplify the principles of the present invention and not limit the invention to the embodiment illustrated and described herein.

In particular, the present invention may be provided in a number of different constructions, each of which may be used to actuate a downhole member with a large actuation force. The present invention may also be used in a plurality of methods for actuating a piston downhole to drive another downhole member. Reference to "up" or "down" is made for description purposes, with "up" meaning away from the downhole member being driven by the piston and "down" meaning toward the downhole member being driven by the piston. Further "forward" is the direction of movement of the piston for actuation and "reverse" is the direction of movement of the piston for repositioning of the piston for another actuation.

Figure 1:
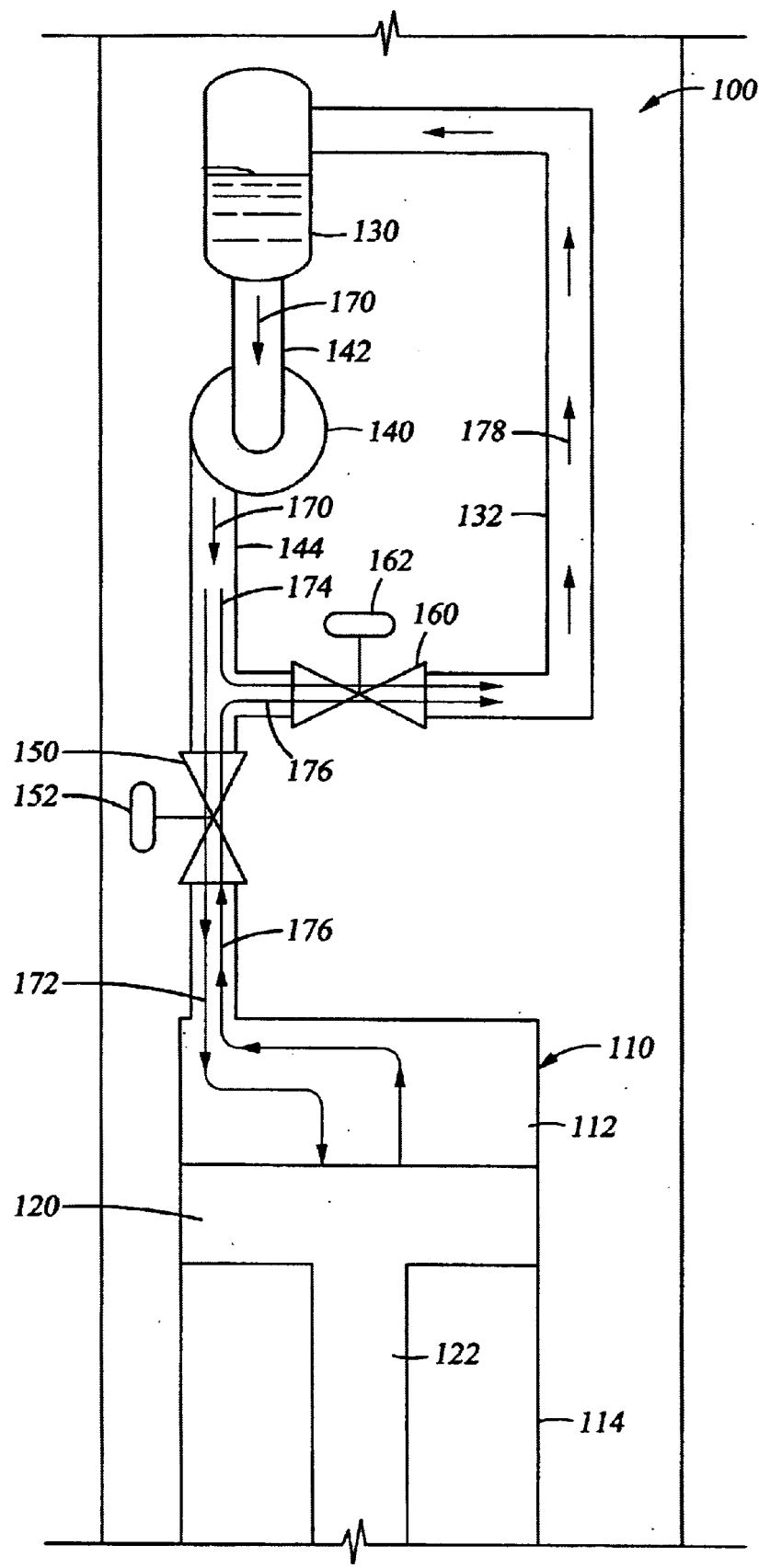
FIG. 1 is a schematic view of a prior art actuator assembly that includes valves to direct the flow of hydraulic fluid through the system.
Figure 2:
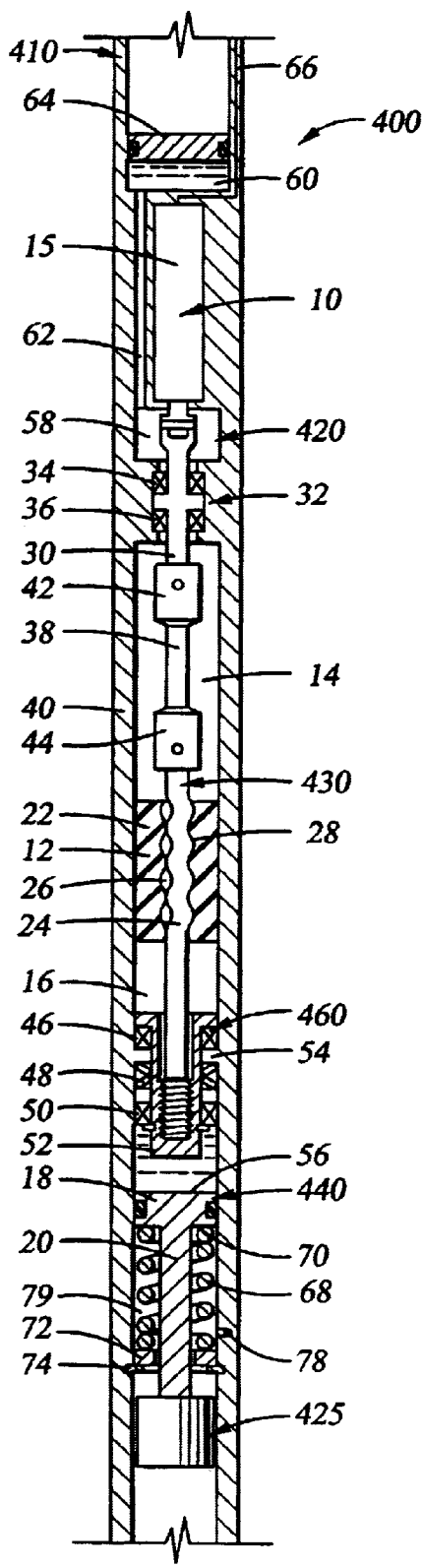
FIG. 2 is a cross-sectional view of the actuator assembly of the present invention.

Referring initially to FIG. 2, the actuator system 400 of the present invention is a valveless, bi-directional, axial drive system used to drive another member. Although actuator system 400 is preferably for use in the oilfield industry, it should be appreciated that the actuator system 400 of the present invention may be used for actuating a device in any industry. The actuator system 400 includes an actuator assembly 410, an actuator housing 40 forming a hydraulic fluid reservoir 60, and a hydraulic enclosure 420. A bi-directional pump assembly 430 driven by an electric motor 10 and a piston assembly 440 are contained within hydraulic enclosure 420.

Figure 4:
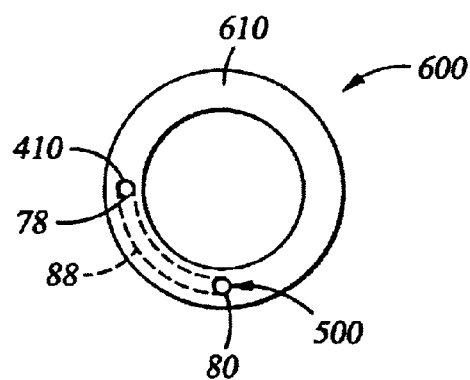
FIG. 4 is a cross-sectional top view, taken perpendicular to the axis of a downhole tool, showing the relative positions of the actuator assembly and the piston repositioning assembly.
Figure 3:
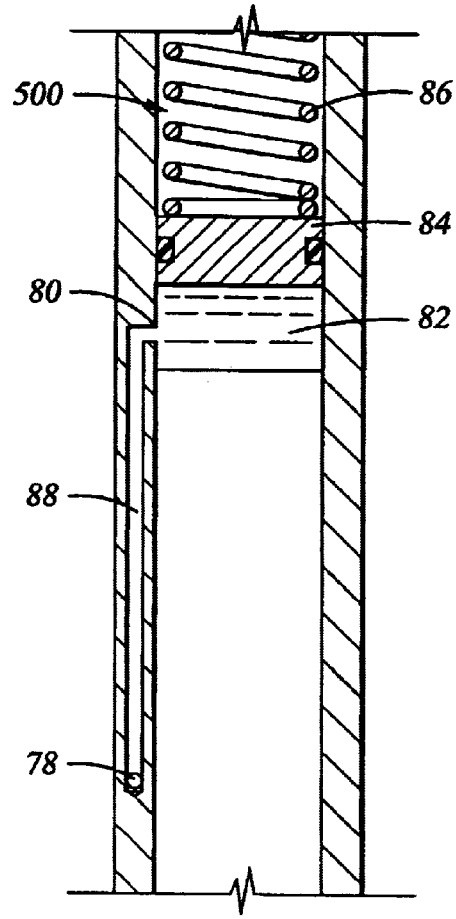
FIG. 3 is a cross-sectional view of the piston repositioning assembly of the present invention.

As shown in FIG. 3, the actuator system 400 may also include a piston repositioning assembly 500, which is connected to the hydraulic enclosure 420 at port 78 via fluid passageway 88, but is separated from the actuator housing 40. FIG. 4 shows a cross-sectional top view taken perpendicular to the axis of a representative downhole tool 600 within which actuator system 400 may be disposed. A top view of actuator 410 and piston repositioning assembly 500 are shown offset from each other within the wall 610 of the downhole tool 600. The actuator 410 is connected to piston repositioning assembly 500 by fluid passageway 88 shown in phantom.

As shown in FIG 2, the hydraulic enclosure 420 forms a low-pressure cavity 58, a low-pressure chamber 14, a high-pressure chamber 16, and a piston cylinder 79 defined as the area a within which the piston 18 reciprocates. Hydraulic fluid reservoir 60 is disposed within actuator housing 40 above hydraulic enclosure 420 at the top of actuator 410. Reservoir 60 maintains fluid communication with hydraulic enclosure 420 by means of a fluid port 62. Internal compensating piston 64 is disposed within reservoir 60 to adjust to the change in fluid level and pressure of low-pressure cavity 58 and low-pressure chamber 14 of hydraulic enclosure 420.

Hydraulic enclosure 420 encapsulates the pump assembly 430 and piston assembly 440 in hydraulic fluid and provides a closed system extending from the fluid reservoir 60 to the piston assembly 440. The closed system is sealed to prevent contamination of the hydraulic fluid from other fluids, such as drilling fluids.

Electric motor 10 is disposed within actuator housing 40 between hydraulic fluid reservoir 60 and hydraulic enclosure 420. It should be appreciated that motor 10 is either powered by batteries or preferably by another power source. Preferably the electric motor 10 includes electrical conductors 66, a power section 15, and a driveshaft 30. The electrical conductors 66 provide power to the power section 15 and extend to an electronics package receiving power from the power source (not shown). The output shaft of motor 10 is connected to a driveshaft 30 which extends into hydraulic enclosure 420. The power section 15, which is mounted within actuator housing 40 outside the hydraulic enclosure 420, turns the drive shaft 30. The drive shaft 30 is journaled at 32 by combination thrust and radial bearings 34, 36 mounted in the actuator housing 40. The lower end of the drive shaft 30 is connected by a constant velocity joint 42 to the upper end of linkage 38, and the lower end of the linkage 38 is connected by a constant velocity joint 44 to pump assembly 430 for driving piston assembly 440.

The pump 12 divides hydraulic enclosure 420 into the low-pressure chamber 14 and the high-pressure chamber 16. The bi-directional pump assembly 430 preferably utilizes a moineau pump 12, but can use any type of reversible pump capable of providing adequate pressure to drive the piston assembly 440 with a high actuation force. The moineau pump 12 includes a stator 22 through which extends a rotor 24. The upper end of the rotor 24 is connected to linkage 38 and the lower end of the rotor 24 extends into a bearing pack 460 comprised of at least one thrust bearing 46, a plurality of springs 48 such as Belleville springs, and at least one radial bearing 50. There is a passageway through the bearing pack 460 so that the bearing pack 460 is not an impediment to hydraulic fluid flow to piston assembly 440. The lower terminal end of rotor 24 is threaded to a threaded nut 52 to maintain the springs 48 and radial bearings 50 against inwardly projecting annular flange 54 of housing 40. The springs 48 provide tension or compression on rotor 24 as it rotates within stator 22 in an eccentric motion to maintain rotor 24 in approximately the same axial position within stator 22.

Piston assembly 440 includes a positioning piston 18, a shaft 20, a return spring 68, a support ring 72, and a snap ring 74. The positioning piston 18 is connected to the shaft 20 that drives another member when the piston 18 is actuated. The return spring 68 is compressed between the lower face 70 of the positioning piston 18 and support ring 72, which is held in place by a snap ring 74 mounted in a groove of actuator housing 40. The return spring 68 provides a force on the positioning piston 18 to move the piston 18 in reverse to its original position after it has been actuated.

As shown in FIGS. 3 and 4, as an alternative to the return spring 68 in the piston assembly 440, or in addition thereto, the actuator system 400 may include a piston repositioning assembly 500 that is external to and may be positioned in a different axial plane than the actuator housing 40. The piston repositioning assembly 500 includes a chamber 82, a repositioning piston 84, and a biasing spring 86. The repositioning piston 82 and biasing spring 86 are disposed within chamber 82, which includes a fluid port 80 through its wall leading into a fluid passageway 88 that maintains fluid communication between the chamber 82 and that portion of piston cylinder 79 below piston 18 via a port 78 in the wall of the actuator housing 40. The biasing spring 86 exerts a force on the repositioning piston 84 so as to force fluid out port 80, through the fluid passageway 88 and into the piston cylinder 79 via port 78. This volume of fluid entering piston cylinder 79 pushes up against the lower face 70 of the positioning piston 18 to reposition the piston 18 for another actuation. FIG. 4 shows a top view of actuator assembly 410 offset from piston repositioning assembly 500 in the wall 610 of a representative downhole tool 600 within which actuator system 400 may be disposed. Ports 78 and 80 connect the two assemblies 410 and 500 by fluid passageway 88 shown in phantom. As shown in FIG. 3, the piston repositioning assembly 500 may be located in a different axial plane than the actuator assembly 410. By way of example, fluid passageway 88 is shown extending toward actuator assembly 410 in a lower axial plane than piston repositioning assembly 500.

Referring again to FIG. 2, in operation, electric motor 10 is actuated to turn the drive shaft 30, which turns the linkage 38 connected to the rotor 24 of pump 12. Fluid communication is provided across drive shaft support bearings 34, 36, and the electric motor 10 is therefore exposed to the hydraulic enclosure pressure. This is advantageous because if a pressure seal was provided across bearings 34, 36, the associated frictional losses would reduce the force capacity of the system. As rotor 24 rotates within stator 22, a specific, small volume of hydraulic fluid is pumped from low-pressure chamber 14 into high-pressure chamber 16 through the passage formed by the lobes 26, 28 of the rotor 24 and stator 22 in bi-directional pump 12. The reservoir compensating piston 64 adjusts for the change in the volume of fluid in low-pressure chamber 14 as pump 12 moves fluid from low-pressure chamber 14 to high-pressure chamber 16. Specifically, reservoir 60 provides additional hydraulic fluid through fluid port 62 into low-pressure cavity 58, which is connected through bearings 34, 36, to low-pressure chamber 14. Where multiple actuators 410 are used, reservoir 60 may be common to all of the actuators 410, and the common reservoir 60 would communicate with each of the hydraulic enclosures 420 for the different actuators.

Pump 12 is preferably a moineau pump because there is a reduced pressure drop through the pump components in a moineau pump as compared to other pumping equipment. As rotor 24 is turned, fluid moves in between the lobes 26, 28 of the stator 22 and rotor 24, respectively, and the rotor 24 moves in an eccentric direction. The rotor 24 merely rotates, it does not move axially. Thrust bearing 46, Belville springs 48, and radial bearing 50 that form bearing pack 460 support the lower terminal end of rotor 24 and accommodate its eccentric movement. Specifically, the springs 48 maintain the force between thrust bearings 46 and radial bearings 50 as rotor 24 moves eccentrically. Likewise, the constant velocity joints 42, 44 and the linkage 38 allow sufficient flexibility for the rotor 24 to move eccentrically while maintaining axial alignment between the rotor 24 and the electric motor 10 axial centerline. Depending upon the length of the rotor 24, it may be possible to eliminate the constant velocity joints 42, 44. A longer length helps stabilize the rotor 24 so that it will have more natural flexure to accommodate the eccentric movement.

Actuator 410 moves positioning piston 18 a precise distance for precision actuation, which allows the exertion of a large actuation force against piston 18 and thus downhole member 425 associated with shaft 20. The rotor 24 rotates at a speed of preferably twenty to sixty revolutions per minute (rpms), and the rotation of rotor 24 corresponds to a specific positive displacement of fluid from low-pressure chamber 14 into high-pressure chamber 16. The high-pressure chamber 16 extends from stator 22 to the top of piston 18. As fluid is pumped into the high-pressure chamber 16, fluid flows through the bearing pack 460, such that the high-pressure fluid is acting on the upper end 56 of piston 18. Piston 18 responds by stroking a specific distance forward within piston cylinder 79 to accept the new volume of hydraulic fluid moving into high-pressure chamber 16.

The pressure increase through the moineau pump 12 determines the pressure or actuation force on piston 18, and therefore on the downhole member 425 being actuated by piston 18. The pressure output from each section or stage (lobe) of a moineau pump 12 is approximately 100 to 150 psi. Therefore, a large number of sections, such as 45 to 50 stages, may be joined together, end to end, to achieve the required actuation pressure, which is preferably greater than 5000 psi, and preferably in the range of 6000 psi.

Once the pump 12 has moved a specific volume of fluid into the high-pressure chamber 16, the electric motor 10 may be stopped to halt the advance of piston 18. After pump 12 stops moving, the engagement between the lobes 26, 28 of the stator 22 and rotor 24 seal against the pressure in the high-pressure chamber 16 to prevent reverse-flow of the fluid. In this way, the lobes 26, 28 provide fail-safe protection against inadvertent back-flow if the motor 10 fails during actuation.

The moineau pump 12 has the additional advantage of being capable of being driven in either direction, i.e., either forward or reverse. The electric motor 10 may rotate either clockwise or counterclockwise to rotate rotor 24 either forward or reverse. Therefore, to reverse piston 18 to its pre-actuation position, electric motor 10 may be reversed, thereby moving fluid out of the high-pressure chamber 16, through pump 12, and into low-pressure chamber 14. As the pump 12 reverses direction and pumps fluid into low pressure chamber 14, pressure is removed from the top surface 56 of the positioning piston 18, and return spring 68 forces piston 18 back into its original, pre-actuation position. Pumping fluid from high-pressure chamber 16 into low-pressure chamber 14 creates a pressure differential such that chamber 16 now becomes the low-pressure chamber and chamber 14 the high-pressure chamber, thereby assisting spring 68 to move piston 18 to its original position.

In an alternate method, the piston repositioning assembly 500, shown in FIG. 3, may be used to move the positioning piston 18 to its pre-actuation position. Typically, once the actuator is downhole, the hydrostatic head pressure is adequate and repositioning piston assembly 500 is not required. However, moving piston 18 to its original position may be a problem at the surface, such as when the actuator 410 is being tested, thus requiring piston assembly 500 to reposition the piston 18. Biasing spring 86 places a set pressure on repositioning piston 84, which in turn pressurizes piston cylinder 79 a predetermined amount due to the hydraulic fluid communication between port 80 in chamber 82 and port 78 in cylinder 79 via fluid passageway 88. The pressure in chamber 82 is typically set, for example, at approximately ten percent or less of the pressure in high-pressure chamber 16, or approximately ten percent of the maximum force of the pressure in chamber 16. Therefore, the force on piston 18 exerted by repositioning assembly 500 may be, for example, only 600 psi in a system where the downhole maximum hydraulic pressure in high-pressure chamber 16 is 6000 psi, thus preventing the repositioning piston 84 from exerting enough pressure in piston cylinder 79 to move piston 18.

Figures 5A, 5B:
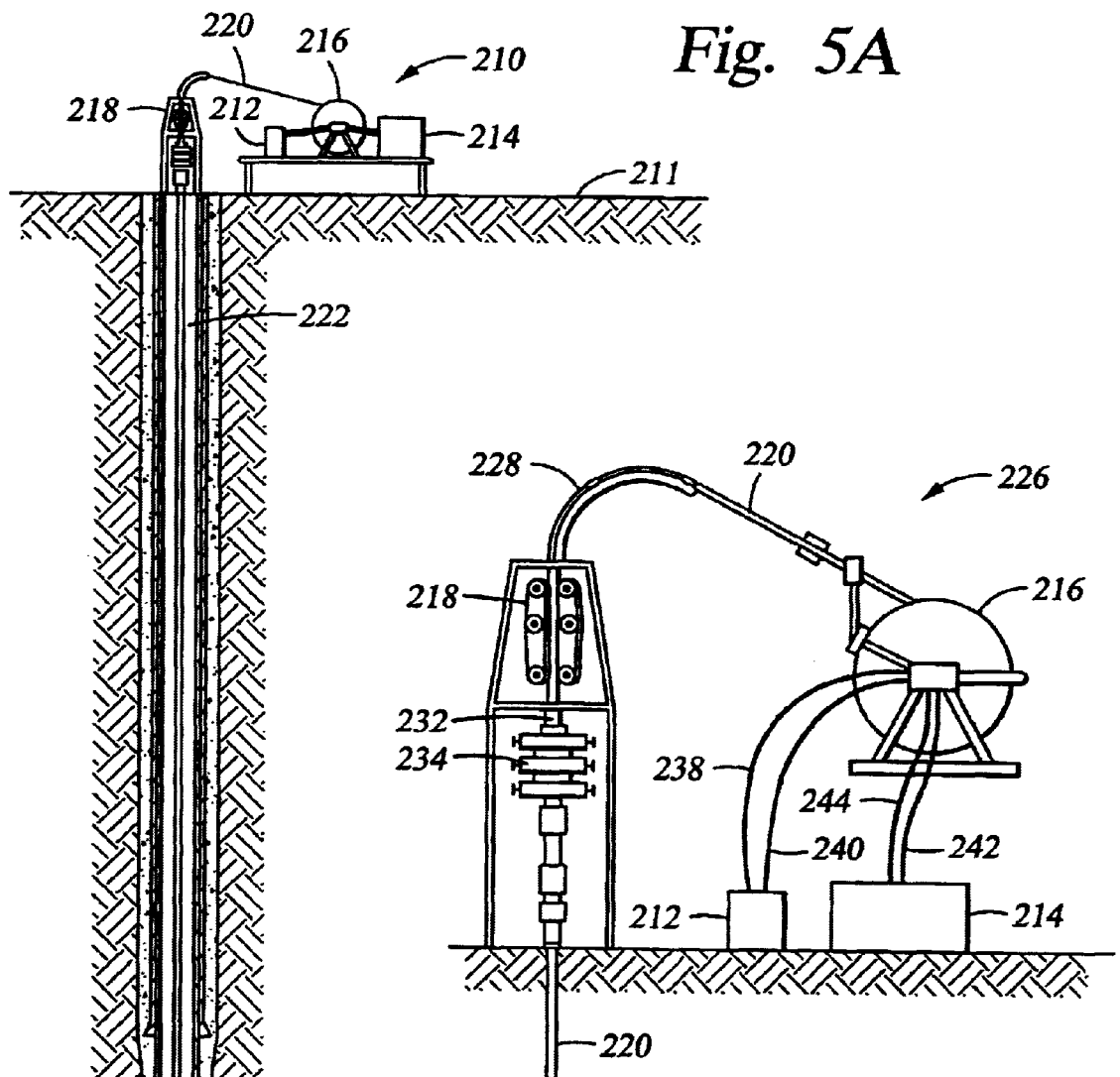
FIG. 5A is a schematic view of an example well.
FIG. 5B is an enlarged view of a portion of the schematic of FIG. 5A showing the surface apparatus for the well.

Referring now to FIGS. 5A and 5B, there is shown an exemplary well 222 in which the actuator system 400 of the present invention may be utilized. It should be appreciated that this application of actuator system 400 is described for explanatory purposes and that the present invention may be used for the actuation of any device whether related to well operations or other types of operations and in particular is not limited to oilfield operations. Further its use is not limited to the particular borehole or well disclosed, it being appreciated that the present invention may be used for various well plans.

The exemplary well 222 of FIGS. 5A and 5B is being drilled using coiled tubing. The coiled tubing operation system 210 includes a power supply 212, a surface processor 214, and a coiled tubing spool 216. An injector head unit 218 feeds and directs coiled tubing 220 from the spool 216 into the well 222. Although the coiled tubing 220 is preferably composite non-metal coiled tubing, it should be appreciated that the present invention is not limited to composite coiled tubing and may be steel coiled tubing. A bottom hole assembly 300 is shown attached to the lower end of composite coiled tubing 220 and extending into a deviated or horizontal borehole 224. The bottom hole assembly 300 includes the actuator system 400 of the present invention.

FIG. 5B illustrates a coiled tubing unit 226 utilizing a spool 216 for feeding composite tubing 220 over a guide 228 and through an injector 218 and stripper 232. The composite coiled tubing 220 is forced through a blowout preventer 234 and into the well 222 by injector 218. A power supply 212 is electrically connected by electrical conduits 238, 240 to electrical conduits in the wall of composite coiled tubing 220. Further, the surface processor 214 includes data transmission conduits 242, 244 connected to data transmission conduits also housed in the wall of composite coiled tubing 220. It should be appreciated that additional power conduits 238, 240 and data transmission conduits 242, 244 may be provided and connected to additional electrical and data conduits housed within the wall of the composite coiled tubing 220. The conduits extend along the entire length of the composite coiled tubing 220 and are connected to a supervisory module disposed in bottom hole assembly 300. The supervisory module controls the power to the actuator system 400 and the communication from the surface with the actuator system 400. Data may also be received and transmitted from actuator system 400 utilizing composite coiled tubing 220. The power conduits and data conduits preferably comprise an economical, low-resistance conductive material such as stranded copper wire. See U.S. patent application Ser. No. 09/081,961 filed May 20, 1998 and entitled "Drilling System," hereby incorporated herein by reference.

Figure 6:
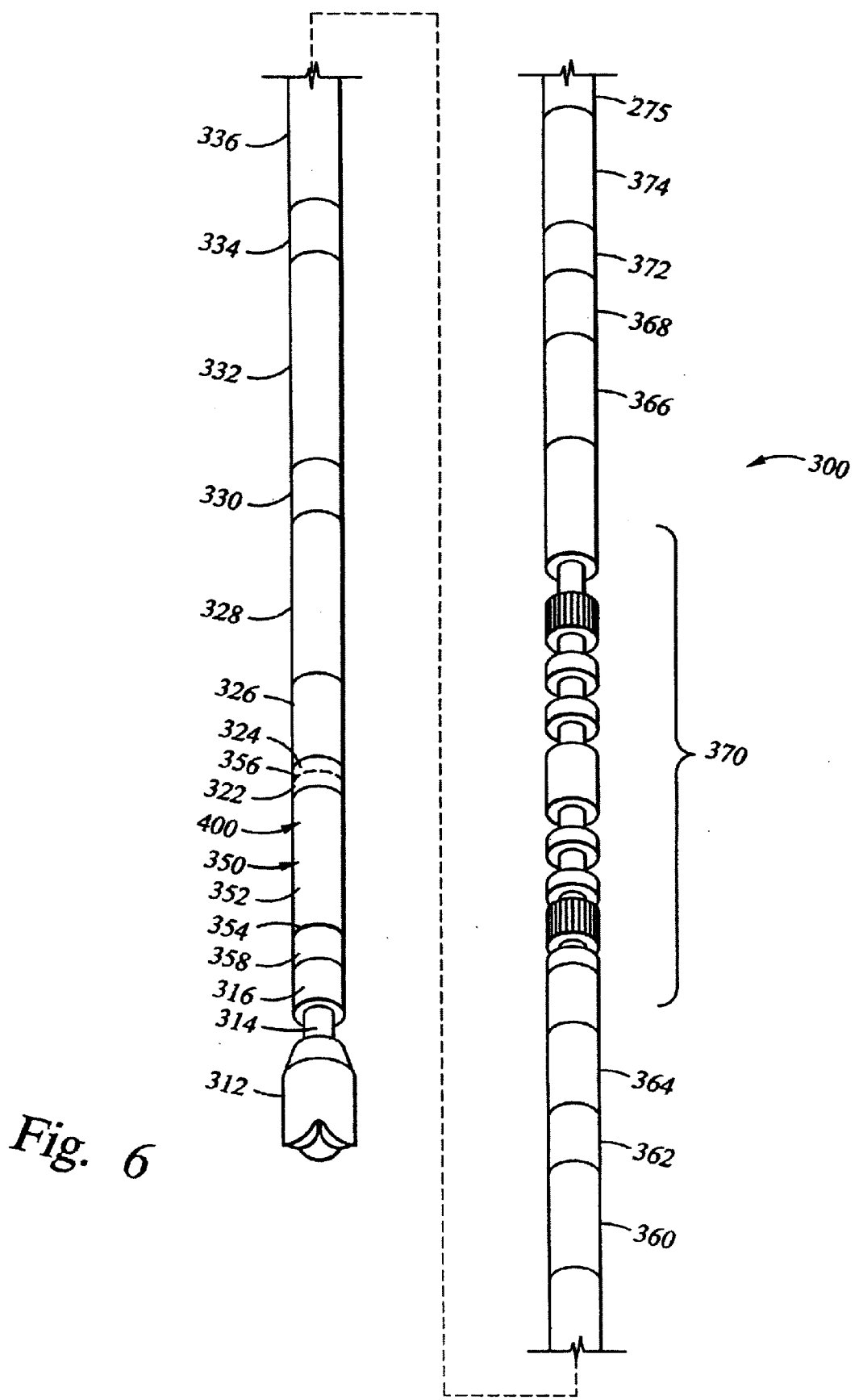
FIG. 6 is an enlarged view of the bottom hole assembly shown in FIG. 5A wherein the actuator system of the present invention may be disposed.

FIG. 6 depicts an exemplary bottom hole assembly 300 within which the actuator system 400 of the present invention may be utilized. Bottom hole assembly 300 includes a drill bit 312 mounted on a drive shaft 314, a bearing assembly 316, a steering assembly 350, an electronics section 322, a near bit orientation sensor 324 having an inclinometer and magnetometer, an upper constant velocity (CV) sub 326, a power section 328 with wire subs, a check valve 330, a resistivity sub 332, an electric disconnect 334, and a sensor sub 336 including an orientation package. The bottom hole assembly 300 also may include a propulsion system 370 having a lower tractor back pressure control module 360, a lower tension/compression sub 362, pressure measurement sub 364, an upper tractor back pressure control module 366, an upper tension/compression sub 368, a supervisory sub 372, and a flapper ball drop 374. Actuator system 400 may be internally disposed within bottom hole assembly 300 to provide an actuation force to drive a component member, such as, for example, the steering assembly 350.

The bottom hole assembly 300 is connected to composite coiled tubing string 220 extending to the surface 211 of well 222 as shown in FIG. 5A. The bottom hole assembly 300 may be used with any type of work string, such as coiled tubing, composite coiled tubing 220, or drill pipe, and also may be used with a wire line. There is no rotation of the bottom hole assembly 300 using either coiled tubing or steel tubing. It should be appreciated that other tools may be included in the bottom hole assembly 300. The tools making up the bottom hole assembly 300 will vary depending on the well operation being performed including drilling, completion, intervention and workover. It should be appreciated that the present invention is not limited to use in a particular bottom hole assembly and other alternative assemblies may also be used. Further details on the individual components of the bottom hole assembly 300 and their operation may be found in U.S. provisional application Ser. No. 60/063,326, filed October 27, 1997 entitled "Drilling System" and U.S. patent application Ser. No. 09/081,961 filed May 20, 1998 entitled "Drilling System", both hereby incorporated herein by reference.

The steering assembly 350, within which actuator system 400 may be disposed, includes an upper housing 352 connected to a lower housing or nose 358 by a universal joint 354 and a pressure housing 356 connected to the upper end of upper housing 352. The lower housing 358 is connected to bearing pack 316 which is connected to and supports the lower end of drive shaft 314 and bit 312. A plurality of actuator systems 400 may be disposed internally of upper housing 352 to simultaneously drive several members of the steering assembly 350. Further details on the individual components of the steering assembly 350 and their operation may be found in U.S. patent application Ser. No. 09/467,588, filed on Dec. 20, 1999 and entitled "Three Dimensional Steerable System," hereby incorporated herein by reference.

The actuator 410 may be used as part of the drill bit steering control mechanism such as steering assembly 350 that includes an angle cam contacted by three wedges disposed within a wedge body and equally spaced apart around the circumference of the angle cam. In such an application, three separate actuator assemblies 410, would be disposed internally of upper housing 352, each one driving one of the wedges to adjust the position of the angle cam, which would be connected to universal joint 354 that rotates to control the direction and angle of the drill bit 312 while drilling.

Each actuator assembly 410 is driven by electric motor 10 with power preferably provided from the surface 211 through electrical conduits extending through composite coiled tubing 220 or alternatively from batteries housed in the drilling assembly. The position of the angle cam is thus controlled by rotating the drive shaft 30 of each electric motor 10 a predetermined number of turns to pump a precise amount of fluid into the high pressure chamber 16 and against piston 18 to move piston 18 a precise distance so that the wedge member moves axially with respect to the surface of the angle cam a certain amount. Depending upon the number of rotations of the electric motor 10, the pistons 18, and thereby the wedge members, are moved axially toward or away from the surface of the angle cam.

The electrical current that can be passed from the surface 211 down a wireline or through steel tubing, or through composite coiled tubing 220 to the electric motor 10 is limited. Thus, one objective of the present invention is to maximize the actuation force output given the limited current that can be transmitted downhole. The actuator assembly 410 of the present invention is designed to exert an actuation force up to 6000 psi or more. To drive the large moineau pump 12 and create the desired actuation force, the electric motor 10 will require approximately 6–7 amperes (amps) of current. To provide this power several electrical conduits 66 will be required downhole, thus requiring composite coiled tubing 220 with connectors capable of handling several wires. To operate the electric motor 10 of the present invention, ten conduits, for example, may be run through composite coiled tubing string 220, with eight electrical conduits 66 being used for power and the other two conduits being used for data transmission.

The actuator 410 includes the advantages of being valveless and of receiving power directly from the surface 211 by wireline or through electrical conduits extending through composite coiled tubing 220. Further a fluid actuation pressure of approximately 6000 psi may be achieved. Thus, the actuator assembly 410 is optimized for the limited power available downhole to achieve significantly increased actuation pressures.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims, which follow, the scope of which shall include all equivalents of the subject matter of the claims.

What is claimed is:

1. An actuator for actuating a device, comprising:
    a housing having a chamber adapted for containing fluid, said chamber having first and second portions;
    a piston disposed in one of said portions; and
    a pump member disposed between said portions within said chamber and communicating with said portions to pump a specific volume of fluid between said one of said portions and the other of said portions causing said piston to move a predetermined distance within said one of said portions.

2. The actuator of claim 1 wherein said one of said portions is a cylinder.

3. The actuator of claim 1 further including a compensating chamber in communication with said chamber.

4. The actuator of claim 3 wherein said compensating chamber includes a compensating piston.

5. The actuator of claim 1 further including biasing means for biasing said piston towards said pump member.

6. The actuator of claim 1 wherein said pump member is a bi-directional pump.

7. The actuator of claim 6 wherein said bi-directional pump is a moineau pump.

8. The actuator of claim 6 wherein said pump is driven by an electric motor.

9. The actuator of claim 10 further including a power source providing power through conductors extending from said power source to said electric motor.

10. The actuator of claim 8 wherein said pump includes a rotor disposed within a stator.

11. The actuator of claim 10 further including a linkage connecting said electric motor and said rotor.

12. The actuator of claim 11 wherein said linkage is connected by constant velocity joints.

13. The actuator of claim 10 wherein said rotor is supported by a bearing pack.

14. The actuator of claim 13 wherein said bearing pack comprises at least one thrust bearing, at least one radial bearing, and a plurality of springs.

15. The actuator of claim 8 wherein said electric motor includes a drive shaft supported by bearings mounted in said housing.

16. The actuator of claim 15 wherein said bearings comprise at least one thrust bearing and at least one radial bearing.

17. The actuator of claim 15 wherein said bearings allow fluid communication therethrough.

18. The actuator of claim 1 wherein said piston is movable between a non-actuation position and an actuation position.

19. The actuator of claim 18 wherein said piston further includes a return spring for moving said piston from said actuation position to said non-actuation position.

20. The actuator of claim 18 further including a repositioning assembly in fluid communication with said one of said portions to exert a fluid pressure for moving said piston from said actuation position to said non-actuation position.

21. An actuator for actuating a device, comprising:
    a housing having a chamber adapted for containing fluid, said chamber having first and second portions;
    a piston disposed in one of said portions; and
    a bi-directional pump member disposed between said portions within said chamber and communicating with said portions to pump fluid between said one of said portions and the other of said portions causing said piston to move within said one of said portions;
    wherein said pump is driven by an electric motor and includes a rotor disposed within a stator and wherein said rotor is supported by a bearing pack and is threaded for threading engagement with a nut that retains said bearing pack within said housing.

22. An actuator for actuating a downhole member from the surface of a well, comprising:
    a housing having a chamber adapted for containing fluid;
    a moineau pump disposed within said chamber and dividing said chamber into a low pressure chamber and a high pressure chamber;
    a piston disposed in said high pressure chamber movable between an actuation position and a non-actuation position;
    said moineau pump in communication with said low and high pressure chambers to pump fluid therebetween; and
    said moineau pump adapted to pump fluid from said low pressure chamber to said high pressure chamber to move said piston and actuate the downhole member in said actuation position and to pump fluid from said high pressure chamber to said low pressure chamber to allow said piston to move to said non-actuation position.

23. The actuator of claim 22 further including tubing extending from said housing to the surface.

24. The actuator of claim 23 wherein said tubing is composite coiled tubing.

25. The actuator of claim 24 wherein said composite coiled tubing includes conductors embedded within a wall of said composite coiled tubing.

26. The actuator of claim 23 wherein said tubing is steel tubing.

27. The actuator of claim 26 further including wires disposed internally of said steel tubing.

28. The actuator of claim 22 further including a motor disposed within said housing, wherein said moineau pump includes a stator and a rotor, and said motor is adapted to rotate said rotor.

29. The actuator of claim 28 wherein said motor rotates said rotor a predetermined number of rotations to pump a specified volume of fluid into said high pressure chamber to move said piston a predetermined distance within said chamber and with a predetermined maximum force against the downhole member.

30. A method for actuating a downhole assembly comprising:
   activating a motor to rotate a rotor of a moineau pump disposed between a low pressure chamber and a high pressure chamber;
   pumping a predetermined volume of fluid from said low pressure chamber to said high pressure chamber;
   increasing pressure within said high pressure chamber,
   applying the increased pressure against u piston disposed within said high pressure chamber; and
   moving the piston associated with the downhole assembly to actuate the assembly.

31. A method for actuating a downhole assembly comprising:
   activating a motor to rotate a rotor of a moineau pump disposed between a low pressure chamber and a high pressure chamber;
   pumping a predetermined volume of fluid from said low pressure chamber to a said high pressure chamber;
   increasing pressure within said high pressure chamber;
   applying the increased pressure against a piston disposed within said high pressure chamber;
   moving the piston associated with the downhole assembly to actuate the assembly;
   pumping fluid from said high pressure chamber into said low pressure chamber. and
   moving said piston to a non-actuation position.

32. The method of claim 31 further comprising exerting fluid pressure from a repositioning chamber against the piston.

33. An actuator for driving a downhole assembly member, said actuator comprising:
   a housing disposed internally of said downhole assembly;
   a reservoir containing hydraulic fluid disposed internally of said housing:
   a hydraulic enclosure in fluid communication with said reservoir disposed internally of said housing;
   a bi-directional pump assembly disposed internally of said hydraulic enclosure between a low-pressure chamber and a high-pressure chamber;
   an electric motor for driving said bi-directional pump;
   a piston assembly disposed in said high-pressure chamber; and
   a repositioning assembly disposed internally of said downhole assembly offset from said housing, and in a different axial plane than said housing.

34. An apparatus for displacing a piston comprising:
   a chamber containing said piston and a bi-directional pump;
   a motor adapted to rotate a rotor of sad pump in both directions; and
   each rotation of said pump corresponding to a precise displacement of said piston.

35. The apparatus of claim 34 wherein said piston is displaceable to a plurality of positions upon operating said pump in either direction.

36. The apparatus of claim 34 further comprising a force member that opposes displacement of said piston when said pump is rotated in one direction and assists displacement of said piston when said pump is rotated in the opposite direction.

37. The apparatus of claim 36 wherein said force member is a biasing spring adapted to engage said piston.

38. The apparatus of claim 36 wherein said force member is a repositioning assembly in fluid communication with said chamber t exert a fluid pressure on said piston.

39. A method for positioning a piston comprising:
   disposing a piston in a first position within a chamber;
   disposing a pump within the chamber;
   rotating a rotor of the pump in a direction to pump a predetermined volume of fluid into the chamber;
   displacing the piston to a predetermined position; and
   maintaining the piston in said predetermined position.

40. The method of claim 39 further comprising:
   rotating the pump in the opposite direction to pump said predetermined volume of fluid out of the chamber; and
   displacing the piston from said predetermined position to said first position.

41. The method of claim 39 further comprising:
   rotating the pump in the opposite direction to pump another predetermined volume of fluid out of the chamber; and
   displacing the piston from said predetermined position to another predetermined position.

42. The method of claim 39 further comprising:
   rotating the pump in the one direction to pump a different predetermined volume of fluid into the chamber; and
   displacing the piston from said predetermined position to a different predetermined position.

43. The method of claim 39 further comprising:
   opposing the displacement of the piston.

44. The method of claim 39 further comprising:
   exerting an actuation force on another member with said piston.

45. An actuator for actuating a device, comprising:
   a housing having a chamber adapted for containing fluid, said chamber having first and second portions;
   a piston disposed in one of said portions;
   a pump member disposed between said portions within said chamber and communicating with said portions to pump a specific volume of fluid between one of said portions and the other of said portions causing said piston to move a predetermined distance within said one of said portions; and
   a reservoir in communication with said chamber;
   wherein said chamber and said reservoir form a closed system for containing fluid.

* * * * *